Aug. 17, 1965  G. C. FLUMERFELT  3,200,636
APPARATUS FOR DETECTING WATER VAPOR IN GAS
Filed Jan. 30, 1963

FLOW INDICATOR  PRESSURE REGULATOR

FLOW INDICATOR  PRESSURE REGULATOR

INVENTOR.
GENE C. FLUMERFELT.
BY
Brown, Critchlow, Flick & Peckham
his ATTORNEYS.

United States Patent Office 3,200,636
Patented Aug. 17, 1965

3,200,636
APPARATUS FOR DETECTING WATER
VAPOR IN GAS
Gene C. Flumerfelt, Pittsburgh, Pa., assignor to Mine
Safety Appliances Company, Pittsburgh, Pa., a corporation of Pennsylvania
Filed Jan. 30, 1963, Ser. No. 255,047
3 Claims. (Cl. 73—29)

This invention relates to the analyzing of a gas to determine its water vapor content.

It often is important to know what the concentration of water vapor may be in a gas. One way of determining this has been to divide a moist gas stream into two parts and pass one stream through an adsorption bed, where the heat evolved by adsorption of water is measured by a thermal transducer also coupled to another adsorption bed through which the other stream flows after passing through a drier. Periodically, the streams are switched so that the first one flows through the other bed while the second stream dries the first bed. Such a system is satisfactory, except that it requires a considerable amount of equipment and space and is rather complicated.

It is among the objects of the invention to provide for the determination of water vapor concentration in a gas by the use of only a single stream of gas and considerably less equipment than heretofore, whereby the size, cost, maintenance and sample flow requirements all can be reduced. Another object is to provide a system which can be operated under conditions below atmospheric pressures.

The invention is illustrated in the accompanying drawings, in which

Figure 1:
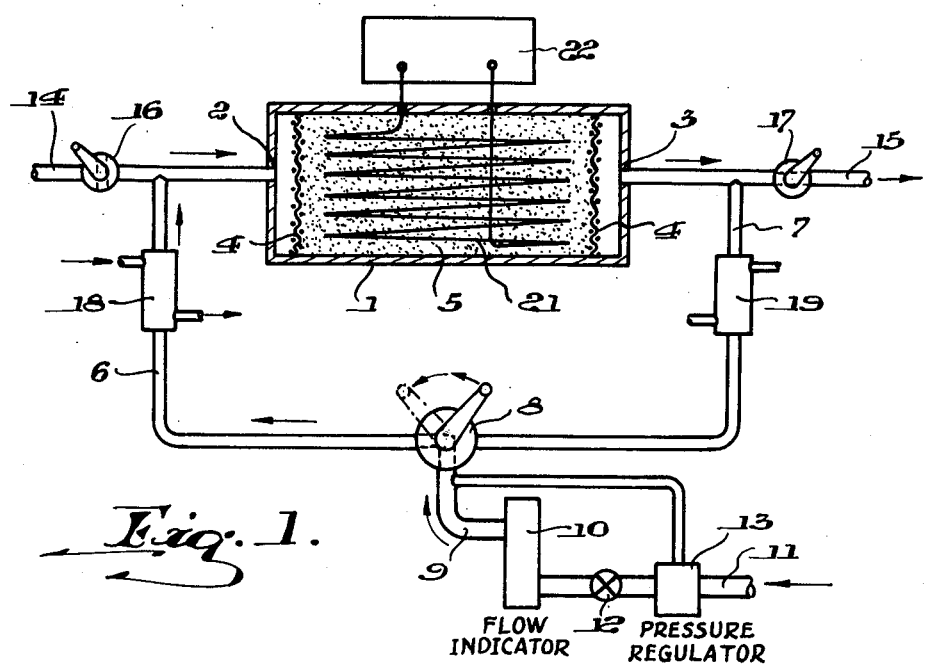
FIG. 1 is a simplified view of my apparatus, partly shown in section.

Referring to FIG. 1 of the drawings, a cylindrical casing 1 has combination inlet and outlet ports 2 and 3 at its opposite ends. Spaced inwardly a short distance from each of these ports is a screen 4, and the space between the two screens is filled with a water adsorbent 5 of any suitable kind, such as silica gel. Delivery pipes 6 and 7 are connected with the casing ports 2 and 3, respectively, and each pipe has an inlet that is connected to a three-way valve 8 that can be operated electrically or in any other suitable manner. The inlet of this valve is connected to the outlet of a feed pipe 9 leading from a flow indicator 10 connected to an inlet pipe 11 that contains a flow valve 12 and a pressure regulator 13. Each of the delivery pipes is provided with an outlet branch 14 or 15, the outer ends of which open to the atmosphere or are connected to a source of reduced pressure, such as a pump or aspirator (not shown). These branch pipes contain valves 16 and 17 that can be operated electrically or otherwise to open or close the respective pipes. For best results, the delivery pipes extend through suitable heat exchangers 18 and 19.

A stream of gas containing water vapor is conducted in any suitable manner to inlet pipe 11, where its pressure is reduced to the desired value by the pressure regulator. The flow valve 12 is adjusted to give the desired flow rate, which can be measured by the flow indicator, so the gas enters the three-way valve 8 at a constant rate of flow. With valve 16 closed and valve 17 open, the three-way valve is shown connecting the feed pipe with delivery pipe 6 and closing off the other delivery pipe. The gas flowing through pipe 6 is heated to a predetermined temperature by heat exchanger 18 and then enters port 2 of the adsorption bed casing. The gas flows through the adsorption bed, which removes the water vapor from it, and then leaves the other end of the casing and flows through a portion of the adjoining delivery pipe 7 and out through the open valve 17 in branch pipe 15. The heat evolved in the adsorption bed by adsorption of water vapor is sensed by suitable means, preferably by an electrical sensor such as a thermal transducer 21, which may be a thermopile of dissimilar metals that measure temperature differences between the opposite ends of the adsorbent bed 5. The wires of this instrument are connected to an indicator 22 outside of casing 1, which translates the temperature of the bed into concentration of water vapor in the gas stream.

According to this invention, after a predetermined lapse of time, but before the adsorption bed has become moist half way along its length, the main valve 8 is operated to switch the feed pipe to delivery pipe 7. At the same time, the other two valves are reversed in order to open the closed branch pipe 14 and to close the previously open branch pipe. The result is that the direction of flow of the stream of gas through the adsorption bed is reversed and it now enters the dry end of the bed through port 3 and leaves the moist end and pipe 13. The flow rate and gas temperature are the same as before. The moisture from this stream now is adsorbed by the dry end of the bed so that the gas is dried and in continuing through the moist end of the bed will pick up and remove most of the moisture previously deposited therein by the stream when it was flowing in the opposite direction. Again, after a predetermined time and before the bed has become moist half way through from the end at which the gas is entering, the valves are reversed to again reverse the direction of flow through the bed.

In this manner each half of the adsorption bed is dried by the same stream of gas that is depositing its moisture in the othe half of the bed, so the dried part is ready to receive the gas stream as soon as the valves are reversed. It will be seen that here is only one adsorption bed and that there is only one stream of gas. Casing 1 forms the only drier. There is no additional or external drier. The apparatus is simple, with only three switching valves to control its operation. It can be made much smaller and cheaper than heretofore, and its maintenance is simplified. It has the additional advantage of being operated at pressures below atmospheric.

Figure 2:
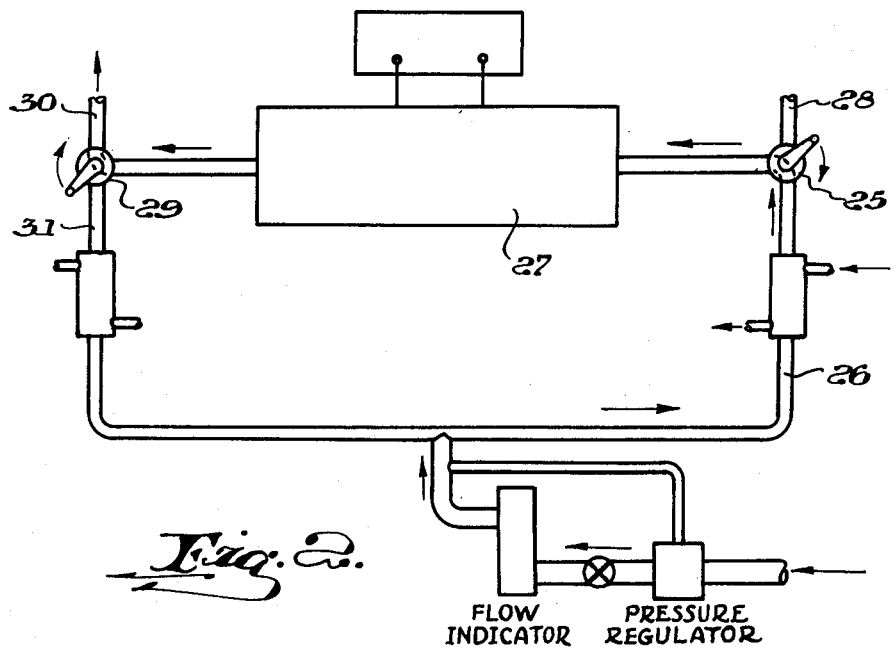
FIG. 2 is a similar view of a modification.

In the modification shown in FIG. 2, everything may be the same as in FIG. 1 except the switching valves. The main valve of the first embodiment is eliminated by making the other two valves three-way valves and locating them at the junctions of the delivery pipes with their outlet branches. Therefore, one valve 25 can be actuated to connect a delivery pipe 26 to one end of the adsorption bed casing 27 while simultaneously shutting off communication with the adjoining branch pipe 28, and at the same time the other valve 29 is actuated to connect the adjoining branch pipe 30 with the section of the adjoining delivery pipe 31 that connects with the casing while simultaneously shutting off communication with the rest of that delivery pipe. When the valves are reversed, the gas stream will flow in the opposite direction through the adsorption bed to deposit moisture in the dry end and carry it from the moist end to atmosphere or a region of sub-atmospheric pressure.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A detector for water vapor in a gas, comprising a casing containing an adsorption bed and having a combination inlet and outlet port at each end of the bed, means for delivering a stream of gas containing water vapor to one of said ports at a predetermined flow rate and simultaneously venting the other port, means for sensing the temperature of the bed produced by the heat of adsorption of said water vapor, means for indicating said temperature as a measure of the concentration of water vapor in the gas, and means operative after a predetermined interval but before half the length of said bed has become moistened to switch said stream of gas to said other port at said same flow rate and to vent said one port in order to reverse the flow through the bed, whereby the moist end of the bed is dried by gas that has deposited its water vapor in the opposite end of the bed.

2. A detector for water vapor in a gas, comprising a casing containing an adsorption bed and having a combination inlet and outlet port at each end of the bed, a delivery pipe connected with each port and having an inlet, a common feed pipe having an outlet connected with both of said delivery pipe inlets, means for delivering a stream of gas containing water vapor to said feed pipe at a predetermined flow rate, valve means for connecting said feed pipe through one of said delivery pipes with one of said casing ports and for simultaneously shutting off communication between the feed pipe and the other casing port while connecting the latter with a region having a pressure at least substantially as low as atmospheric, electrical means for sensing the temperature of said bed produced by the heat of adsorption of water vapor adsorbed from the gas stream flowing through the bed, means for indicating said temperature as a measure of the concentration of water vapor in the gas, and means for operating said valve means after a predetermined interval but before half the length of said bed has become moistened to connect said feed pipe through said other delivery pipe with the other casing port and to connect said one delivery pipe with said region in order to reverse the flow through the bed, whereby the moist end of the bed is dried by gas that has deposited its water vapor in the opposite end of the bed.

3. A water vapor detector according to claim 2, including a heat exchanger associated with each of said delivery pipes to heat the gas flowing therethrough.

References Cited by the Examiner

UNITED STATES PATENTS 2,826,908   3/58   Skarstrom _____ 72—23

OTHER REFERENCES

Villalobos et al. in Gas Chromatography Second International Symposium I.S.A., edited by Noebels et al., Academic Press, New York and London 1961 (pages 39 to 54). (Note particularly pages 40, 43, 44 and 45.)

RICHARD C. QUEISSER, *Primary Examiner.*

JOSEPH P. STRIZAK, *Examiner.*